(12) United States Patent
Mcclellan

(10) Patent No.: US 7,313,761 B1
(45) Date of Patent: Dec. 25, 2007

(54) TREE-STYLE HIERARCHICAL CONTROL WITH GRAPHICAL DEPICTION OF NON-HIERARCHICAL INTERRELATIONSHIPS

(75) Inventor: James R. Mcclellan, Menomonee Falls, WI (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 412 days.

(21) Appl. No.: 09/804,309

(22) Filed: Mar. 13, 2001

(51) Int. Cl.
G06F 3/00 (2006.01)
G06F 3/48 (2006.01)

(52) U.S. Cl. ...................... 715/713; 715/853
(58) Field of Classification Search ............. 345/853, 345/419, 866, 760, 854, 738, 739, 714, 713; 709/223; 715/713, 714, 853, 854, 855
See application file for complete search history.

(56) References Cited

U.S. PATENT DOCUMENTS

| | | | |
|---|---|---|---|
| 4,901,221 A | 2/1990 | Kodosky et al. | |
| 4,914,568 A | 4/1990 | Kodosky et al. | |
| 5,291,587 A | 3/1994 | Kodosky et al. | |
| 5,301,336 A | 4/1994 | Kodosky et al. | |
| 5,475,851 A | 12/1995 | Kodosky | |
| 5,481,740 A | 1/1996 | Kodosky et al. | |
| 5,481,741 A | 1/1996 | McKaskie et al. | |
| 5,497,500 A | 3/1996 | Rogers et al. | |
| 5,504,917 A | 4/1996 | Austin | |
| 5,610,828 A | 3/1997 | Kodosky et al. | |
| 5,644,334 A * | 7/1997 | Jones et al. ................. | 345/419 |
| 5,644,740 A * | 7/1997 | Kiuchi ........................ | 715/853 |
| 5,652,909 A | 7/1997 | Kodosky | |
| 5,731,814 A * | 3/1998 | Bala ............................ | 345/853 |
| 5,732,277 A | 3/1998 | Kodosky et al. | |
| 5,734,863 A | 3/1998 | Kodosky et al. | |
| 5,737,622 A | 4/1998 | Rogers et al. | |
| 5,784,275 A | 7/1998 | Sojoodi et al. | |
| 5,821,934 A | 10/1998 | Kodosky et al. | |
| 5,847,953 A | 12/1998 | Sojoodi | |
| 5,905,649 A | 5/1999 | Sojoodi | |
| 5,920,479 A | 7/1999 | Sojoodi | |
| 5,953,724 A * | 9/1999 | Lowry ......................... | 345/853 |
| 5,974,254 A | 10/1999 | Hsu | |
| 6,028,602 A * | 2/2000 | Weidenfeller et al. ....... | 345/853 |
| 6,064,409 A | 5/2000 | Thomsen et al. | |
| 6,064,812 A | 5/2000 | Parthasarathy | |
| 6,064,816 A | 5/2000 | Parthasarathy | |
| 6,102,965 A | 8/2000 | Dye et al. | |
| 6,111,579 A * | 8/2000 | Alimpich et al. ............ | 715/853 |
| 6,138,270 A | 10/2000 | Hsu | |
| 6,219,628 B1 * | 4/2001 | Kodosky et al. ............. | 703/2 |
| 6,226,783 B1 * | 5/2001 | Limondin et al. ............ | 717/104 |
| 6,298,474 B1 * | 10/2001 | Blowers et al. .............. | 717/104 |

(Continued)

Primary Examiner—Weilun Lo
Assistant Examiner—Truc T. Chuong
(74) Attorney, Agent, or Firm—Anthony L. Miele; Russ Weinzimmer

(57) ABSTRACT

A method and system is provided for generating a tree-style graphical representation that depicts simultaneously hierarchical and non-hierarchical interrelationships among a set of entities. Two sets of specifications are acquired. One set describes a set of hierarchical interrelationships. The other set describes a set of non-hierarchical interrelationships among the same set of entities. Based on the two sets of specifications, a tree-style graphical representation is generated that depicts both hierarchical and non-hierarchical interrelationships. The generated tree-style graphical representation is displayed, as a graphical user interface, on a display device.

26 Claims, 13 Drawing Sheets

U.S. PATENT DOCUMENTS

| | | | |
|---|---|---|---|
| 6,348,935 B1 * | 2/2002 | Malacinski et al. | 715/853 |
| 6,380,937 B1 * | 4/2002 | Dong et al. | 345/853 |
| 6,437,805 B1 | 8/2002 | Sojoodi et al. | |
| 6,553,355 B1 * | 4/2003 | Arnoux et al. | 706/13 |
| 6,584,507 B1 * | 6/2003 | Bradley et al. | 709/223 |
| 6,636,250 B1 * | 10/2003 | Gasser | 345/853 |
| 6,643,642 B1 * | 11/2003 | Habegger | 707/5 |
| 6,751,653 B2 | 6/2004 | Austin | |
| 6,784,903 B2 * | 8/2004 | Kodosky et al. | 715/771 |
| 6,934,667 B2 | 8/2005 | Kodosky | |
| 6,934,668 B2 | 8/2005 | Kodosky | |
| 6,954,724 B2 | 10/2005 | Kodosky et al. | |
| 6,961,686 B2 | 11/2005 | Kodosky et al. | |
| 6,976,222 B2 | 12/2005 | Sojoodi et al. | |
| 6,983,228 B2 | 1/2006 | Kodosky et al. | |
| 6,990,652 B1 | 1/2006 | Parthasarathy | |
| 7,043,693 B2 | 5/2006 | Wenzel et al. | |
| 7,062,718 B2 | 6/2006 | Kodosky et al. | |
| 7,134,090 B2 | 11/2006 | Kodosky | |

* cited by examiner

TREE-STYLE HIERARCHICAL CONTROL WITH GRAPHICAL DEPICTION OF NON-HIERARCHICAL INTERRELATIONSHIPS

RESERVATION OF COPYRIGHT

This patent document contains information subject to copyright protection. The copyright owner has no objection to the facsimile reproduction by anyone of the patent document or the patent disclosure, as it appears in the U.S. Patent and Trademark Office files or records but otherwise reserves all copyright rights whatsoever.

BACKGROUND

1. Field of the Invention

The present invention, in certain respects, relates to the field of graphical user interface. In other respects, the present invention relates to a method and system that creates a tree-style graphical representation that depicts interrelationships among a set of entities.

2. Description of Background Information

A tree-style representation can be used to describe hierarchical relationships. An example of a hierarchical relationship is a parent-child relationship. Entities connected by hierarchical relationships form a hierarchy, which can be depicted using a tree representation. For instance, directories in a computer file system form a hierarchy which can be unambiguously described by a tree representation.

A tree representation can be visualized in different ways. For example, each parent-child relationship can be expressed using an arrow linking the parent and the child, with arrow pointing at the child. Alternatively, left-indentation is also frequently used to visualize a hierarchical relationship in a tree representation. FIG. 1 illustrates an exemplary tree-style graphical representation for a directory hierarchy of a computer file system, displayed, as a graphical user interface, on a computer monitor. In FIG. 1, the subdirectory in a hierarchical relationship (e.g., directory vs. subdirectory) appears left-indented from where its parent directory appears. For example, "FreeLane" in FIG. 1 is a subdirectory of "Program Files" and it is left-indented from where "Program Files" is displayed in the interface. In general, a tree representation can be used to describe hierarchical relationship among a set of entities. Such entities can be people (e.g., parents and children), directories on a computer file system, computer programs, organizations of government, and categories of books.

As shown in FIG. 1, the hierarchical relationships among different directories can be readily seen through a tree-style graphical representation. In addition, such a tree-style graphical representation also provides a means for a user to interactively manipulate the underlying hierarchy. For example, a directory in the hierarchy can be selected, for deletion, by simply clicking on the node that represents the directory. Therefore, a tree is an effective representation for hierarchical relationships. A tree-style graphical representation provides a useful means to manipulate or control a hierarchy.

There are non-hierarchical relationships. For example, data flow relation is not hierarchical. Different representations can be used to describe non-hierarchical relationships. For example, a block diagram can be used to depict data flow relationships among different functional units. FIG. 2 shows an exemplary block diagram, in which data flows between different functional units are described as the links between the functional blocks. For example, "2D Images" is flown from Image Acquisition Unit (a functional unit), where 2D images are acquired, to Image Processing Unit (another functional unit), where acquired 2D images may be processed.

The above tree representations do not depict non-hierarchical relationships such as the data flow among different entities within the hierarchy. Although existing block diagram techniques do show non-hierarchical relationships among entities, they do not depict the hierarchical relationships of those entities.

SUMMARY OF THE INVENTION

The present invention is provided to improve a tree-style representation to depict relationships among a set of entities. More specifically, an improved method and system is presented that addresses the generation and modification of a tree-style graphical representation that allows simultaneous depiction of both hierarchical and non-hierarchical interrelationships among a set of entities.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION

Figure 1:
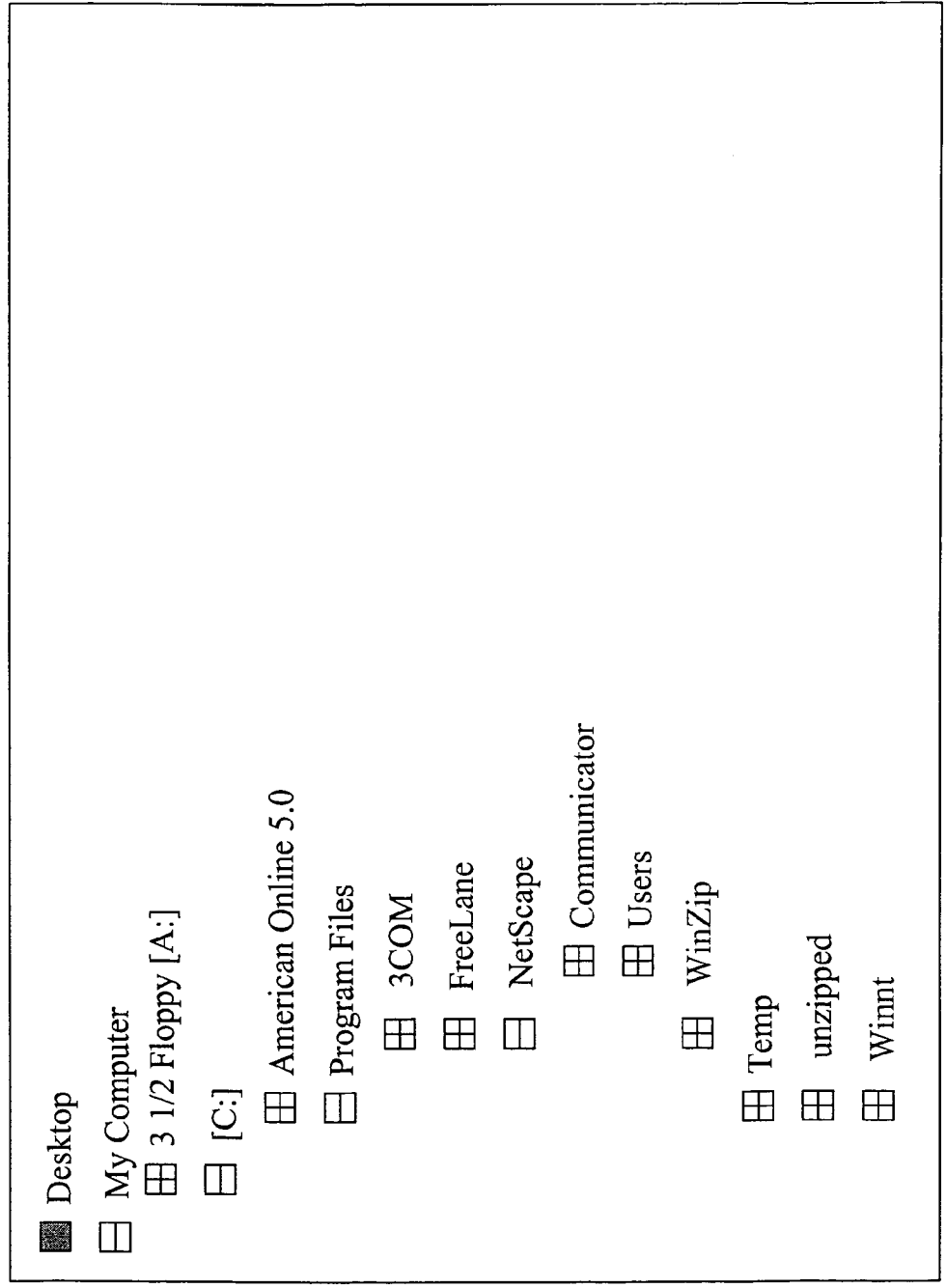
FIG. 1 illustrates an exemplary tree representation for a directory hierarchy in a computer system.
Figure 2:
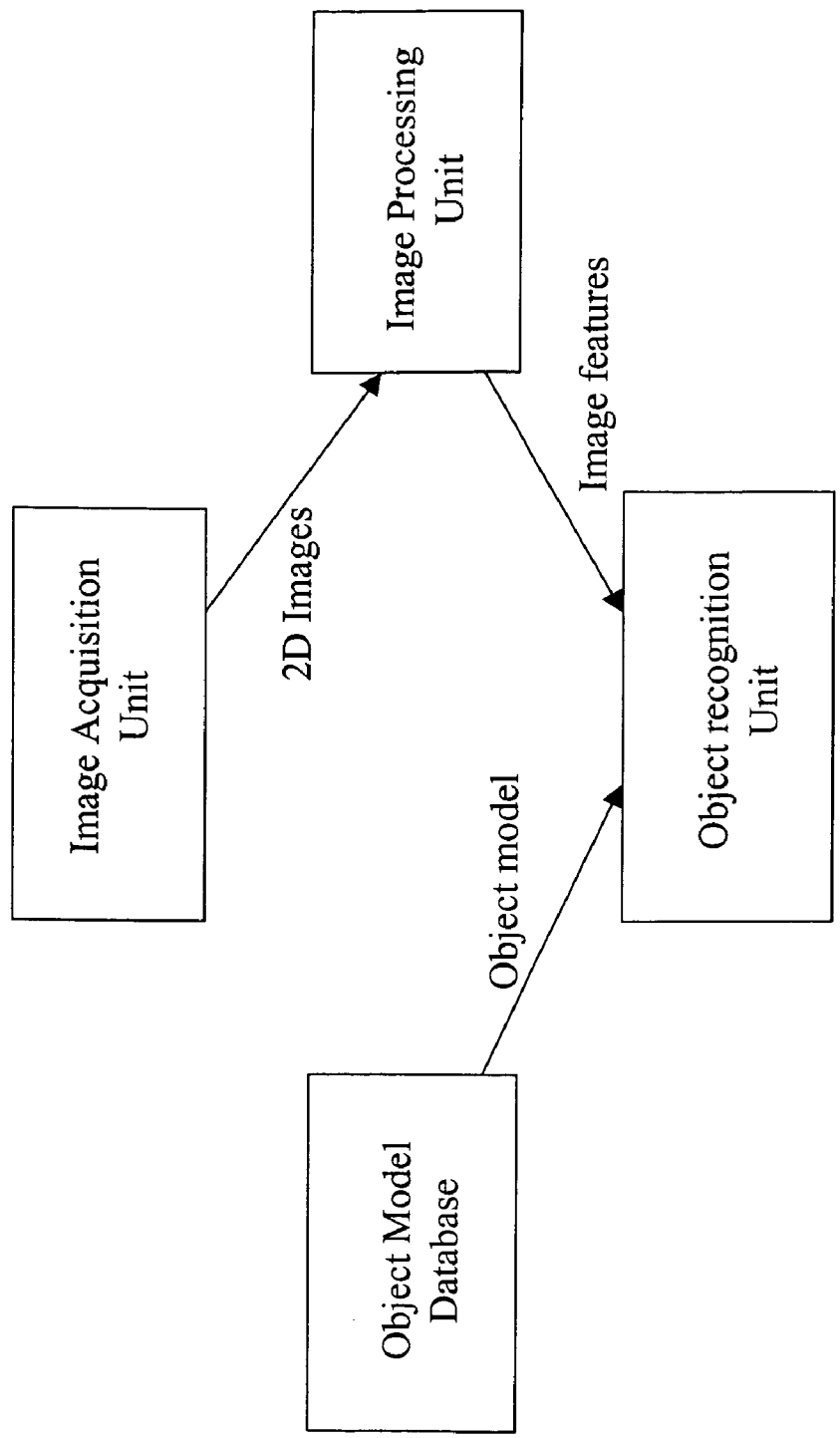
FIG. 2 illustrates an exemplary block diagram that describes data flow relationships among different functional units.
Figure 3A:
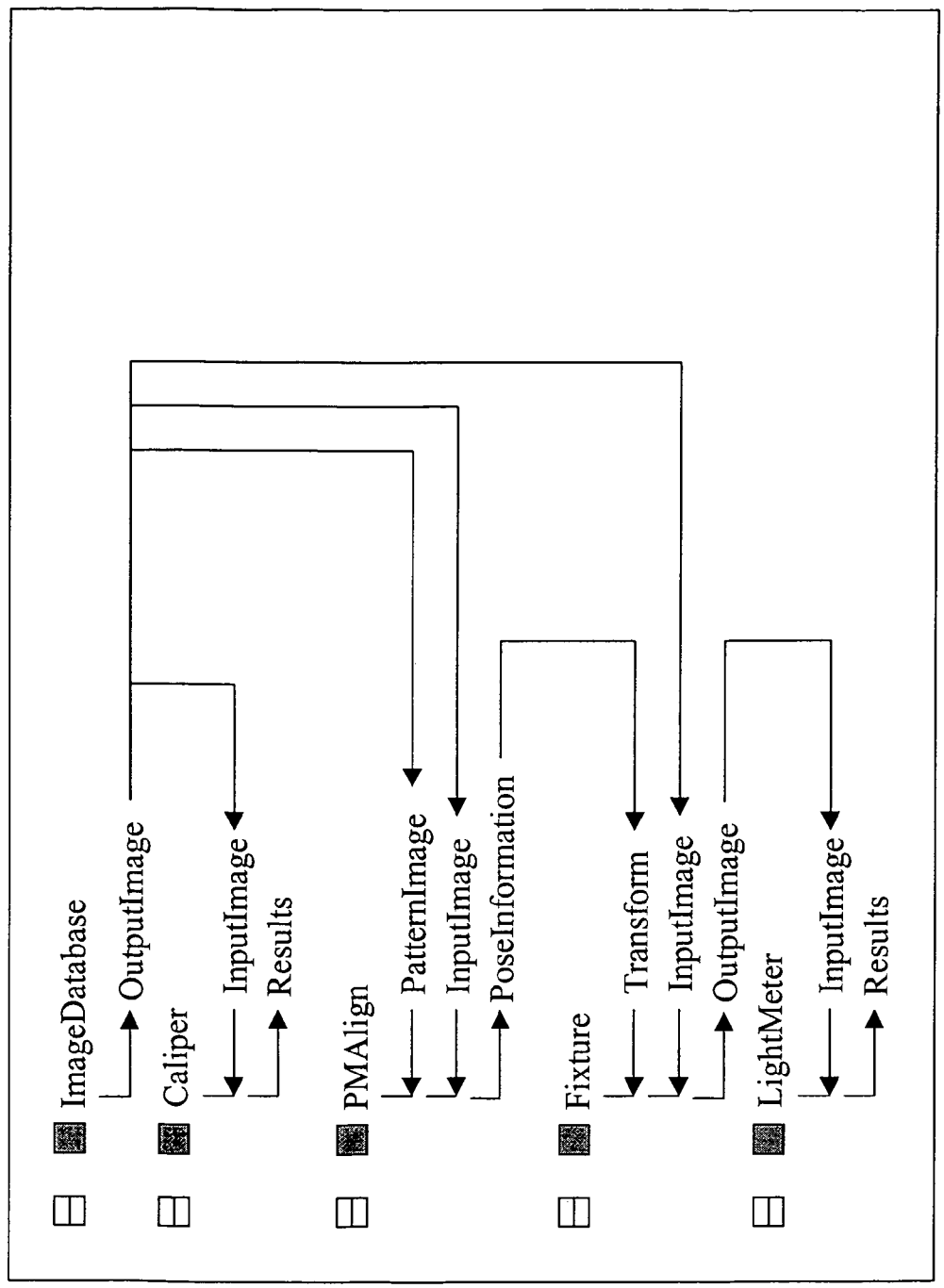
FIG. 3A shows an example of a tree-style graphical representation that depict both the hierarchical interrelationships among a set of machine vision related tools as well as the non-hierarchical data flow interrelationships among those tools.

There is a need for a tree-style graphical representation that depicts both hierarchical and non-hierarchical relationships among a set of entities. FIG. 3A illustrates an example of such a graphical representation depicting the hierarchical and non-hierarchical interrelationships among a set of machine vision related entities. In this example, a left-indentation method is used to construct a tree depicting hierarchical relationships (e.g., OutputImage under Image-Databased is left-indented). Links on the right side of the tree describe non-hierarchical relationships (e.g., the arrows coming out of OutputImage under Imagedatabase pointing to various entities appear on the right side of the left-indented tree).

In FIG. 3A, there are five entities at the same level of the hierarchy (ImageDatabase, Caliper, PMAligh, Fixture, and LightMeter). Each of those entities has lower level entities. The left-indented tree (the left side of the representation shown in FIG. 3A) alone does not indicate any relationship between, for example, ImageDatabase and Caliper even though these two entities may be related through a data flow relationship. For example, Caliper may retrieve an image from ImageDatabased as input (i.e., OutputImage of Image-Database is the InputImage of Caliper). PMAlign may also retrieve both an image as well as a pattern image from ImageDatabase as input and then produces PoseInformation as its output. Such pose information may be further used by Fixture to apply to an image, retrieved from ImageDatabase, to generate an output image. Such data flow relationships are non-hierarchical and are clearly represented in FIG. 3A. An embodiment of the invention is presented that enables the generation of such a tree-style graphical representation.

The processing described below may be performed by a general-purpose computer alone or in connection with a specialized computer. Such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 3:
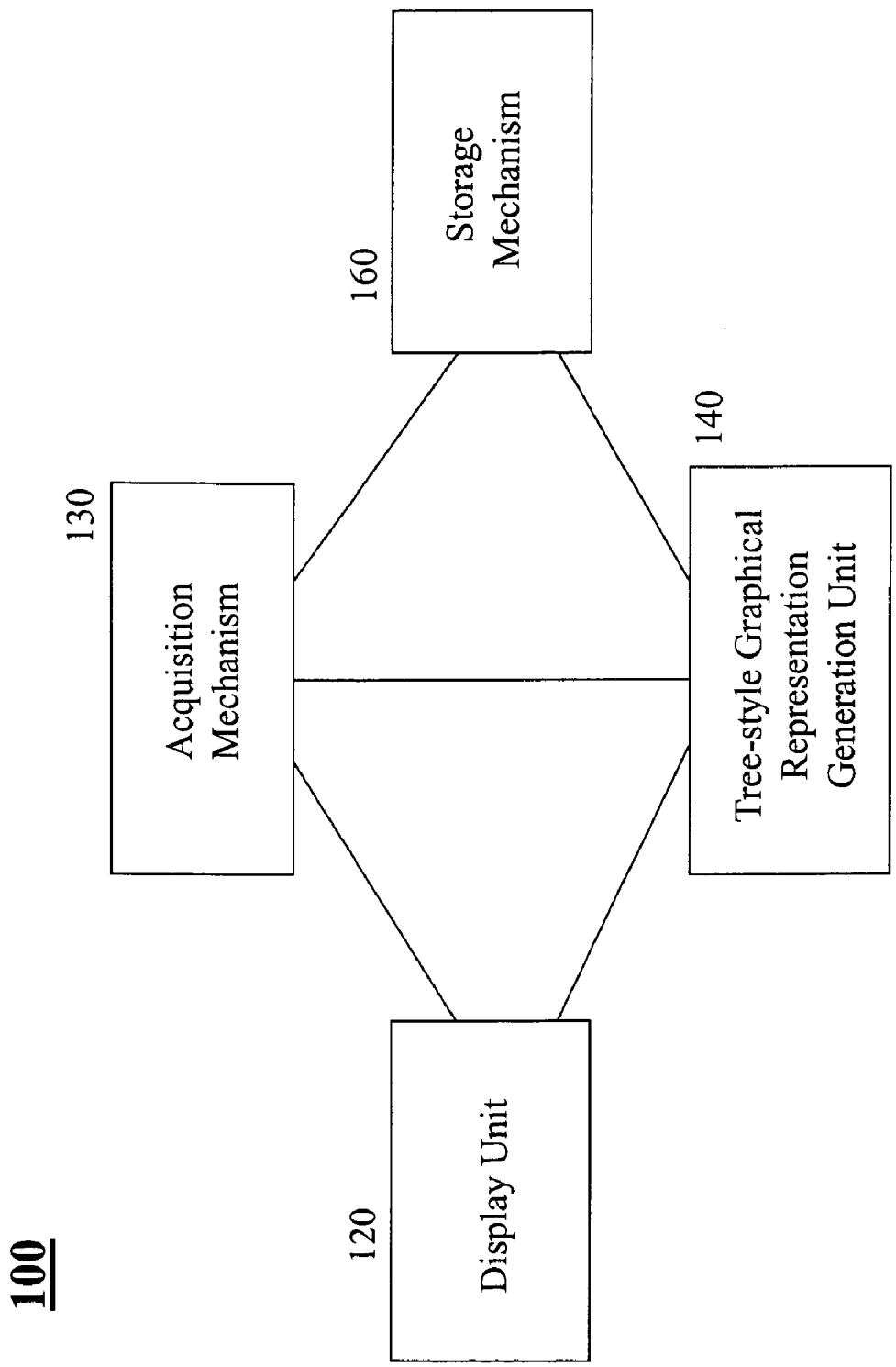
FIG. 3 illustrates an exemplary embodiment of the present invention, in which a tree-style graphical representation can be generated and modified.

FIG. 3 shows a system 100 that generates a tree-style graphical representation to depict both hierarchical and non-hierarchical interrelationships among a set of entities. The illustrated system 100 comprises a tree-style graphical representation generation unit 140, an acquisition mechanism 130, a storage mechanism 160, and a display unit 120.

Acquisition mechanism 130, in the illustrated embodiment, is for acquiring the specifications of entities and the hierarchical and non-hierarchical interrelationships among these entities. It may comprise different approaches to obtaining the specifications. For example, acquisition mechanism 130 may load a digital file containing the specifications and then parse the file to extract the specifications. Acquisition mechanism 130 may also obtain the specifications interactively via a graphical user interface.

Specifications acquired by acquisition mechanism 130 may comprise the information that defines a set of entities and the information that describes the interrelationships among those entities. Interrelationships may include both hierarchical as well as non-hierarchical interrelationships. For example, in an object-oriented computer program, objects and their properties form hierarchical relationships. In this case, objects and their properties may be specified as entities. Each object and its properties may be connected by hierarchical relationships. An example of a non-hierarchical interrelationship in an object-oriented computer system may be the data flow relationships between objects.

Specifications acquired by acquisition mechanism 130 are stored in storage mechanism 160. Storage mechanism 160 may retain specifications of hierarchical interrelationships separately from where specifications of non-hierarchical interrelationships are stored so that different types of interrelationship specifications may be maintained and retrieved individually. Storage mechanism 160 may also comprise a separate storage 270 for tree representations that are generated based on the stored specifications.

In FIG. 3, tree-style graphical representation generation unit 140 retrieves specifications stored in storage mechanism 160 and then generates a tree-style graphical representation that may depict both hierarchical interrelationships and non-hierarchical interrelationships, according to the specifications.

Tree-style graphical representation generation unit 140, in the illustrated embodiment, may comprise different processing components. For example, one processing component may generate an initial tree representation based on the specifications of hierarchical interrelationships. Based on the initial tree representation, a different component may generate an augmented tree representation that incorporates non-hierarchical interrelationships in the initial tree representation, according to the specifications of non-hierarchical interrelationships. Yet another different component may display the augmented tree representation, as a graphical user interface, on display unit 120.

A tree representation, constructed from specifications of entities and interrelationships, may be implemented in an abstract form such as a data structure. Such an abstract tree representation is rendered into its graphical form, or a tree-style graphical representation, before it can be displayed graphically on a display device.

Display unit 120 in FIG. 3 may comprise a screen, as a display device, and a control device that controls the display device. For example, the display device may be a computer monitor. The control device may comprise a personal computer, a keyboard, and a pointing device such as a mouse. A tree-style graphical representation, generated by tree-style graphical representation generation unit 140, may be graphically rendered and displayed on a display device, included in display unit 120. An interactive graphical interface may also be displayed and functioned on the same display device of display unit 120 so that acquisition mechanism 130 may interactively acquire specifications about entities and interrelationships of the entities in a graphical means.

Figure 4:
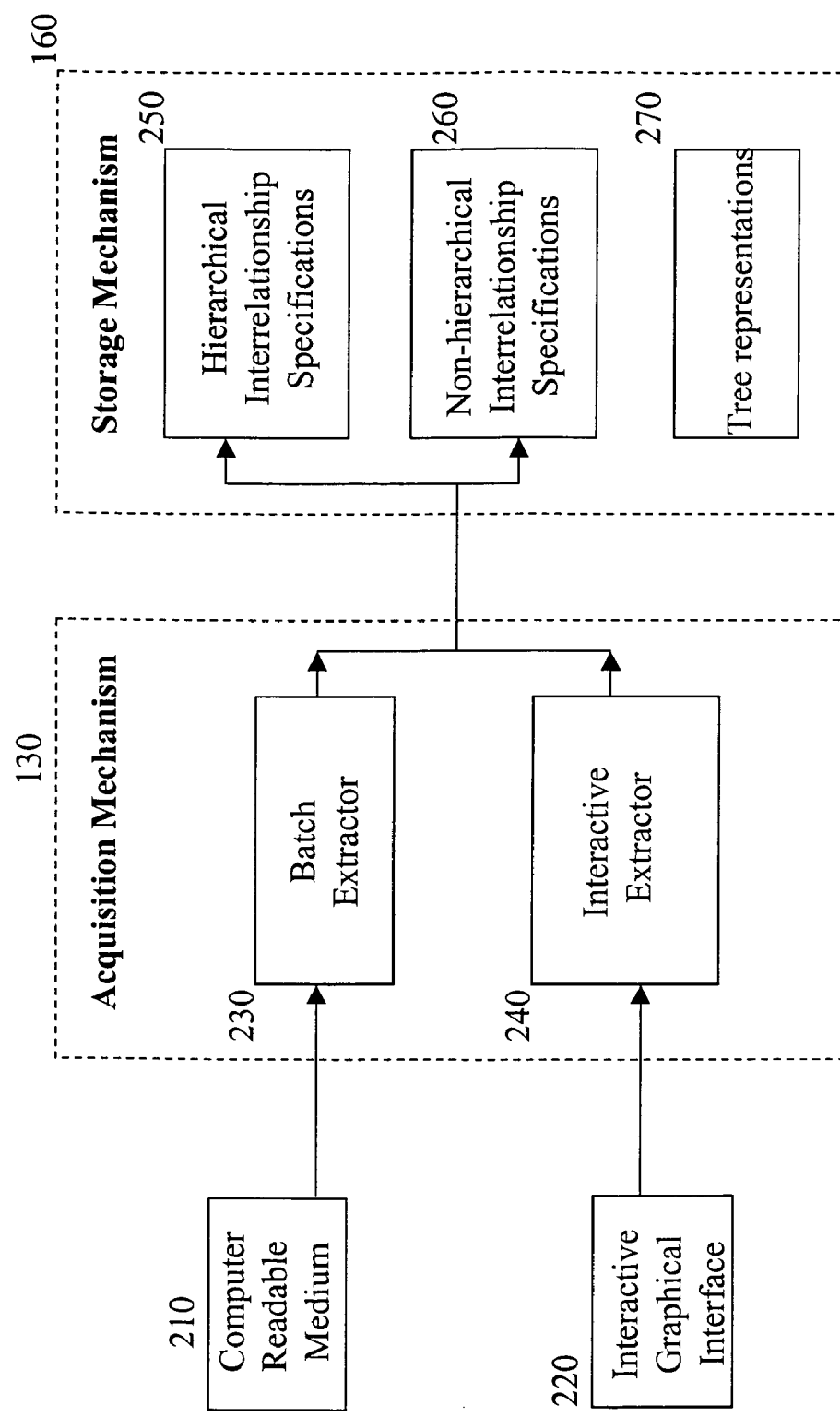
FIG. 4 shows an exemplary high level block diagram for an embodiment of the present invention, in which specifications for interrelationships can be acquired and stored.

FIG. 4 shows a more detailed system configuration for acquiring specifications of interrelationships. In particular, FIG. 4 shows how acquisition mechanism 130 relates to display unit 120 and storage mechanism 160. In FIG. 4, acquisition mechanism 130 comprises, for example, two components: a batch extractor 230 and an interactive extractor 240. Storage mechanism 160 comprises, for example, three parts: part 250 to store hierarchical interrelationship specifications, part 260 to store non-hierarchical interrelationship specifications, and part 270 to store tree representations.

Batch extractor 230 extracts specifications of entities and interrelationships in a batch mode from, for example, a digital file. The digital file may be stored at a remote site on a computer-readable medium 210, such as a disk or a CD-ROM, and may be accessed across network. Batch extractor 230 reads a digital file and extracts specifications from the digital file by parsing the file. Specifications about entities, hierarchical interrelationships, and non-hierarchical interrelationships may be extracted individually as different sets of specifications. Such identified individual sets of specifications may then be stored in corresponding parts of storage mechanism 160. For example, the set of specifications that describe hierarchical interrelationships may be stored in part 250 of storage mechanism 160. The set of specifications that describe non-hierarchical interrelationships may be stored in part 260 of storage mechanism 160.

Acquisition mechanism 130 may also operate in a different mode such as an interactive mode. In this case, interactive extractor 240 interacts with an interactive graphical interface 220, through which definitions of entities as well as specifications about their interrelationships may be obtained in an interactive fashion via a, for example, graphical means. The interactive graphical user interface 220 may be displayed on a display device of display unit 120 and driven by interactive extractor 220 through a control device of display unit 120.

Figure 5:
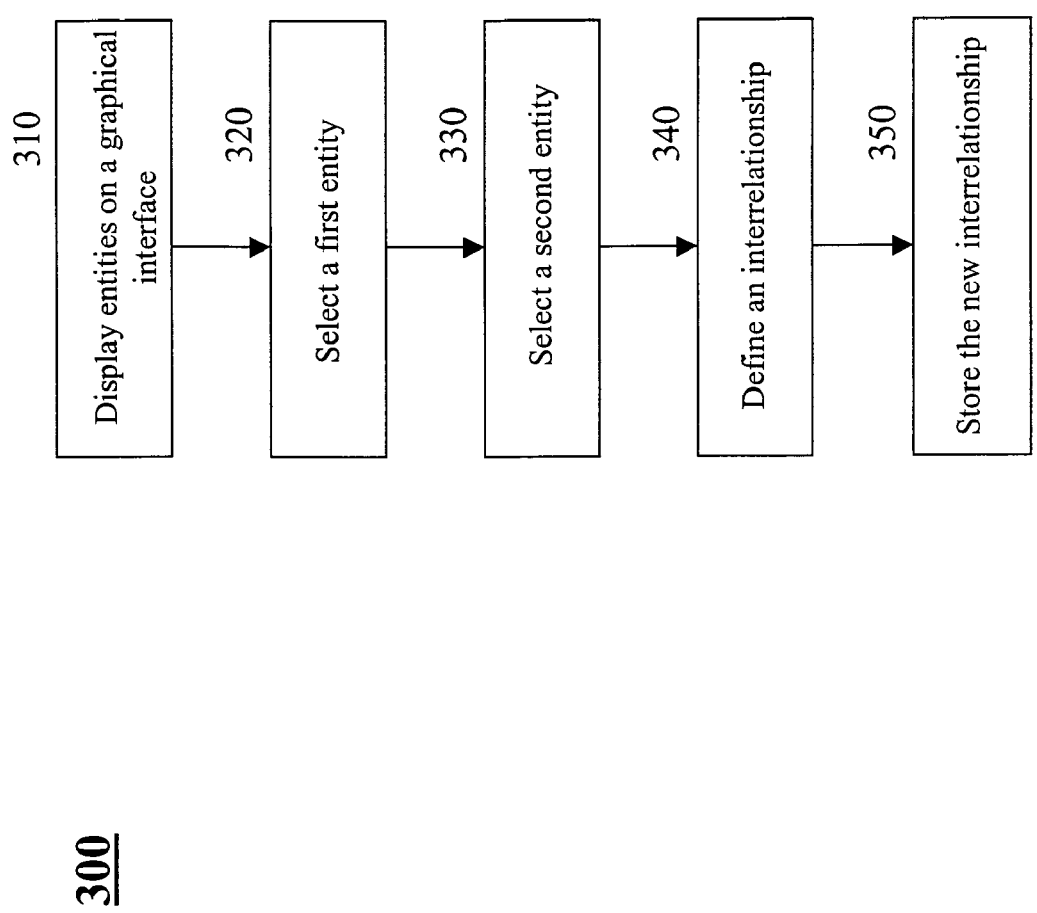
FIG. 5 is an exemplary flowchart of a process to acquire interrelationship specifications.

An exemplary flowchart of the process of interactively acquiring specifications is illustrated in FIG. 5. For example, a set of entities may be defined first at act 310 in an interactive session, in which the names of the entities may be entered through a graphical user interface. An interrelationship may be defined in a subsequent interactive session in, for example, the following sequence of acts. The entities are defined and displayed first in the graphical user interface at act 310 so that they can be graphically selected. A user may then define an interrelationship between two entities by interactively providing a description of the interrelationship and the associated two entities.

The two entities that form an interrelationship are selected at acts 320 and 330, respectively. The selection, made at acts 320 and 330, may be accomplished by simply, for example, clicking on the two entities displayed in the user interface. The description about an interrelationship between the two selected entities is obtained at act 340 from a user interface. The description may include information about the name of the interrelationship, the type of relation (e.g., hierarchical or non-hierarchical), the role each entity plays in the relation (e.g., one entity is the child and one entity is the parent in a hierarchical interrelationship), or the annotation of the relation.

The specifications acquired by interactive extractor 240 are stored at act 350 in corresponding parts of storage mechanism 160. For example, specifications of hierarchical interrelationships may be stored in part 250. Specifications of non-hierarchical interrelationships may be stored in part 260.

Figure 6:
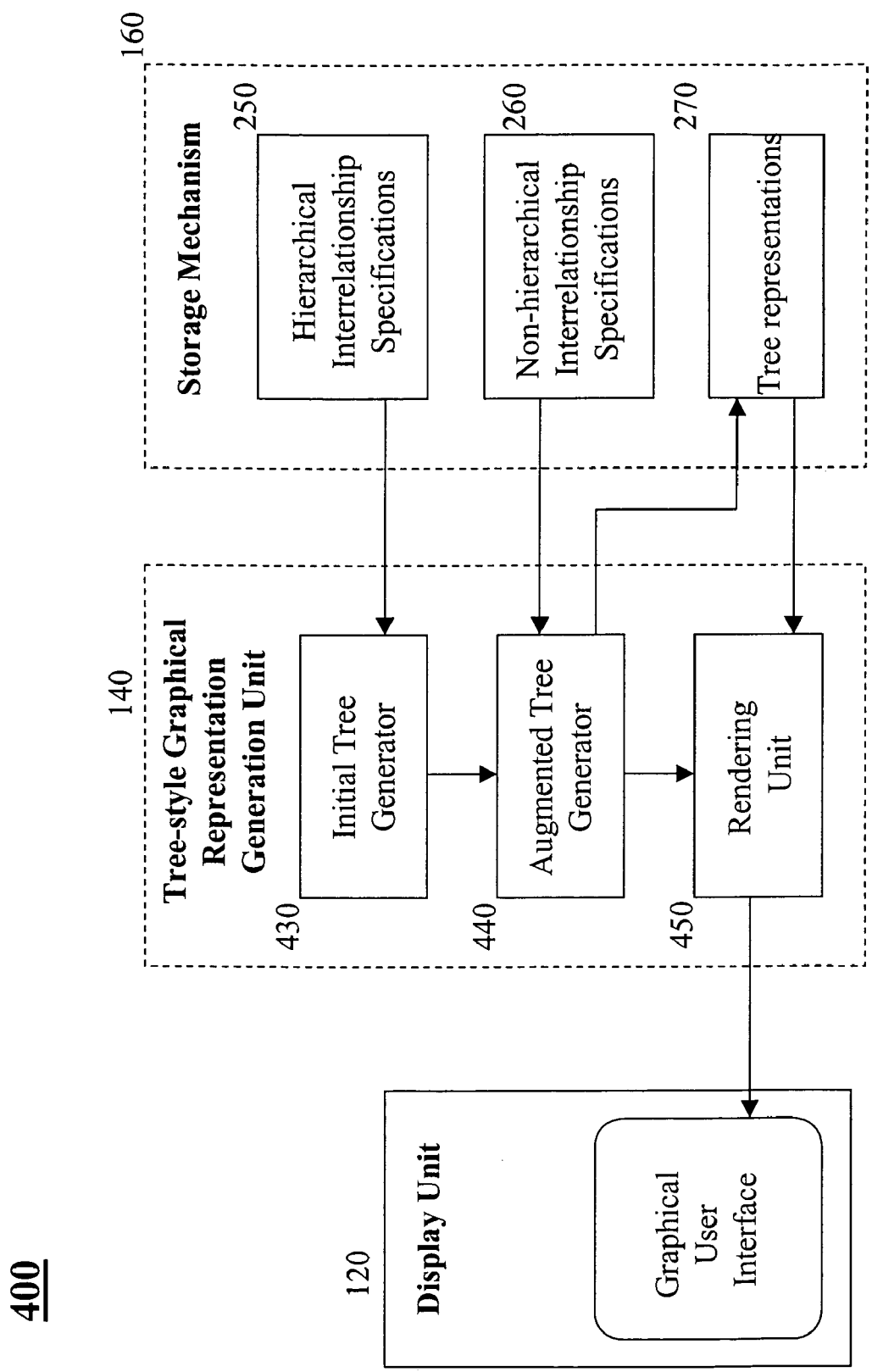
FIG. 6 illustrates an exemplary high level block diagram for an embodiment of the present invention, in which a tree-style graphical representation is generated based on interrelationship specifications.

A tree-style graphical representation can be constructed based on acquired specifications. FIG. 6 shows an exemplary high level block diagram for generating a tree-style graphical representation. In FIG. 6, the relationships among storage mechanism 160, tree-style graphical representation generation unit 140, and display unit 120 are shown. Tree-style graphical representation generation unit 140 comprises, for example, three components: an initial tree representation generator 430, a augmented tree generator 440, and a rendering unit 450.

Initial tree representation generator 430 retrieves, as illustrated in the exemplary diagram shown in FIG. 6, specifications of hierarchical interrelationships from storage mechanism 160. Based on the input specifications, initial tree generator 430 generates an initial tree representation that depicts only the hierarchical interrelationships described by the input specifications. The initial tree representation is then fed into augmented tree generator 440. Augmented tree generator 440 retrieves the specifications for non-hierarchical interrelationships for the same set of entities from part 260 of storage mechanism 160. Based on the specifications for non-hierarchical interrelationships, augmented tree generator 440 depicts the non-hierarchical interrelationships in the initial tree representation. It should be noted that the depiction of non-hierarchical interrelationships does not alter the initial tree structure formed with respect to the hierarchical interrelationships. The augmented tree simultaneously depicts the structure of the hierarchy, described by the hierarchical relationships, and the non-hierarchical relationships among the entities within the hierarchy.

An augmented tree representation, once generated, may be stored in part 270 of storage mechanism 160. The tree representation generated at this stage may be implemented in its abstract form, such as a data structure, instead of in its graphical form. Rendering unit 450 takes an augmented tree representation and renders the tree representation into its graphical form to generate a tree-style graphical representation and displays the graphical representation on display unit 120.

Rendering unit 450 may also graphically convey information about interrelationships in the representation. In an exemplary implementation, line styles or colors are associated with particular kinds of relationships. For instance, a dashed line style may indicate that an interrelationship is invalid. Further, various colors may correspond to types of data flow, such as, for example, images, coordinate transforms, and simple numbers. Rendering unit 450 may also dynamically vary styles or colors for the benefit of the user. In particular, when an entity is selected, all lines linked thereto may become wider so that the user may better visualize the interrelationships of that node.

Rendering unit 450 may provide so-called "tool tips" to convey additional information about the nature of relationships. When a user rests a pointing device over a link, a small pop-up window appears that describes the link. For instance, the window may describe the data type associated with the link.

FIG. 3A shows minus signs to the left of the ImageDatabase, Caliper, PMAlign, Fixture, and LightMeter entities. The respective sub-entities may be hidden by clicking on each minus sign. When sub-entities are hidden, links may not be drawn to the sub-entities. However, the node or nodes to which the sub-entities are linked may be visible. In an exemplary implementation, rendering unit 450 may graphically depict links to hidden sub-entities. For instance, rendering unit 450 may display the symbol "|---->" adjacent to visible entities. Such a symbol may be rendered in various colors and may be associated with pop-up windows. As such, additional information about the link may be conveyed to a user.

Figure 7:
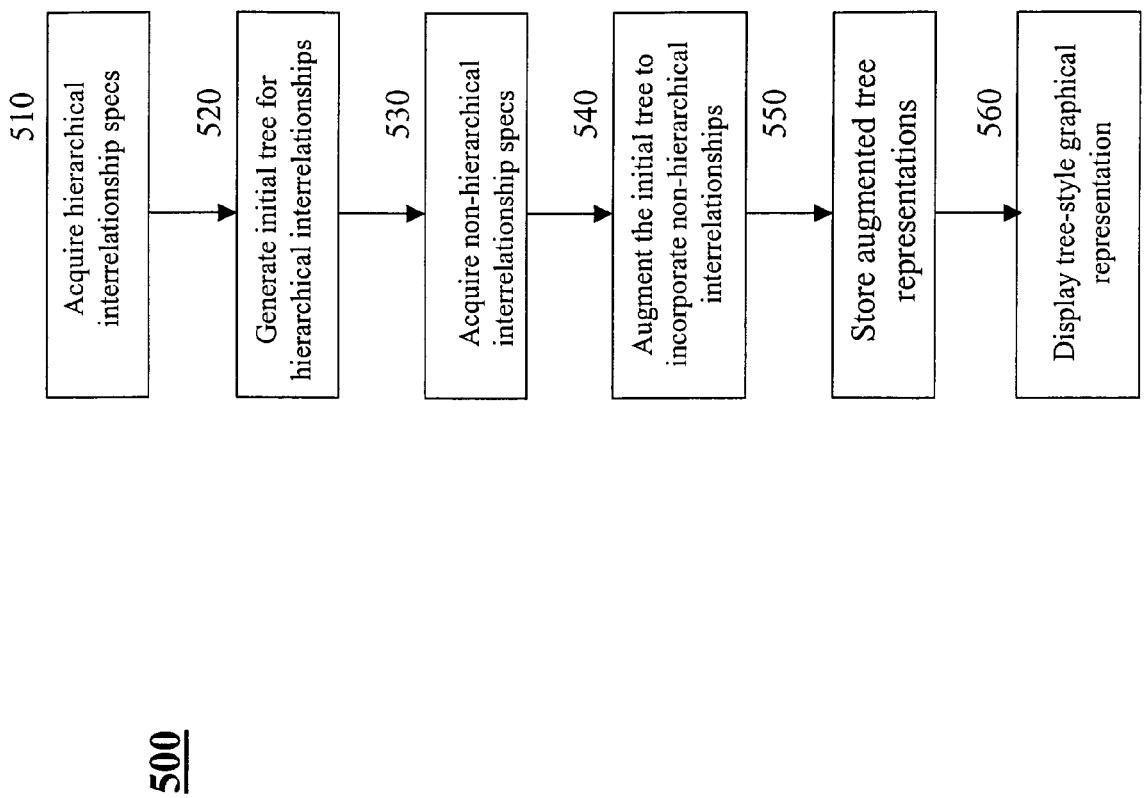
FIG. 7 is an exemplary flowchart of a process to generate a tree-style graphical representation.

FIG. 7 shows an exemplary flowchart of a process of generating a tree-style graphical representation. Specifications of hierarchical interrelationships are obtained at act 510 first. Based on the specifications, initial tree representation generator 430 constructs an initial tree representation at 520. Taking the initial tree representation as input, augmented tree generator 440 retrieves specifications of non-hierarchical interrelationships at act 530. Based on the specifications of non-hierarchical interrelationships, augmented tree generator 440 incorporates the non-hierarchical interrelationships in the initial tree representation to generate an augmented tree representation at act 540. The augmented tree representation is then stored at act 550 in part 270 of storage mechanism 160. Finally, rendering unit 450 renders the augmented tree representation and displays it at act 560 on display unit 120.

A tree-style graphical representation, displayed on a display device, may be modified. Such modification comprises, for example, adding an entity, deleting an entity, adding an interrelationship, deleting an interrelationship, and updating an interrelationship. System 100 shown in FIG. 3 may also be used to modify a tree-style graphical representation, in a similar fashion as a tree is generated, via either a non-graphical or a graphical means.

Modifications to a tree-style representation may be described by a modification specification. For example, if a modification involves adding an entity to a tree, a modification specification may provide information about the new entity and the location in the hierarchy that the new entity may be inserted. Specifically, a modification specification that describes to add an hierarchical interrelationship to a tree may include, for example, the definition of two entities, one defined as the parent entity and the other defined as the child entity, and the definition of the hierarchical relationship to be added such as the name of the relation and characteristics of the relation.

A modification specification may be stored in a digital file on a computer-readable medium, such as medium 210 in FIG. 4, and can be read by batch extractor 230. In this case, one or more modification specifications may be specified in a single digital file. The modifications specified in the digital file may be carried out all at once in a batch mode.

A modification specification may also be acquired interactively, by interactive extractor 240, via interactive graphical user interface 220. In this case, modifications to a tree-style graphical representation may be performed interactively via a graphical means. FIG. 8 to FIG. 12 present exemplary flowcharts of processes that interactively perform different types of modification to a tree-style graphical representation.

Figure 8:
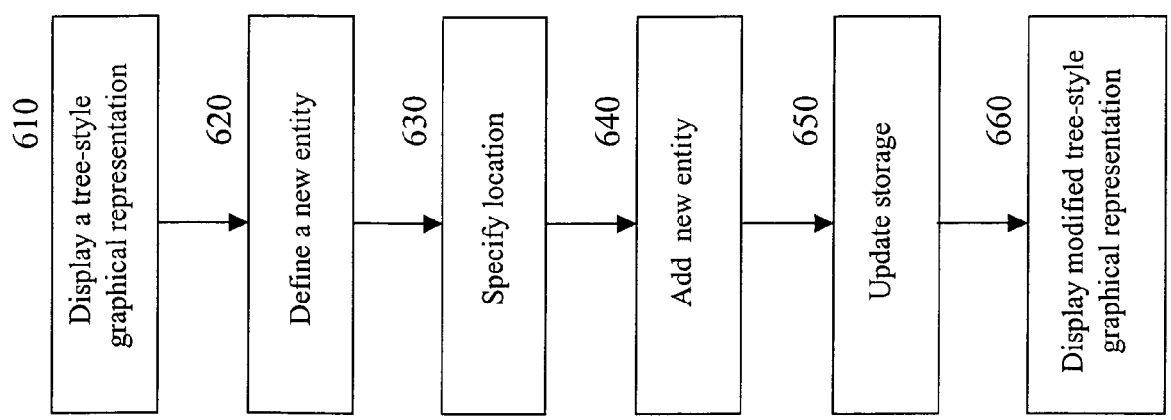
FIG. 8 is an exemplary flowchart of a process to add an entity to an existing tree-style graphical representation.

FIG. 8 is an exemplary flowchart of a process that adds a new entity to an existing tree-style graphical representation. The existing tree representation is first displayed in a graphical user interface at act 610. A pointing device may be activated in the graphical user interface. The new entity is defined at act 620 by, for example, interactively entering, through the graphical user interface, the name of the new entity as well as other associated information. The location where the new entity will be inserted in the tree is specified at act 630. The location to insert the new entity specified at act 630 may be a simple pointing and clicking (at the insertion position in the existing tree) using a mouse connected to the display unit and to the graphical user interface.

Once the new entity is defined and the insertion location is specified, the new entity is added to the existing tree at act 640. The act performed at 640 may involve both updating the abstract representation of the existing tree, such as a data structure, as well as updating the graphical representation of the existing tree on a screen. The updated abstract tree representation is stored in storage mechanism 160 at act 650 and the updated graphical representation is displayed at act 660.

Figure 9:
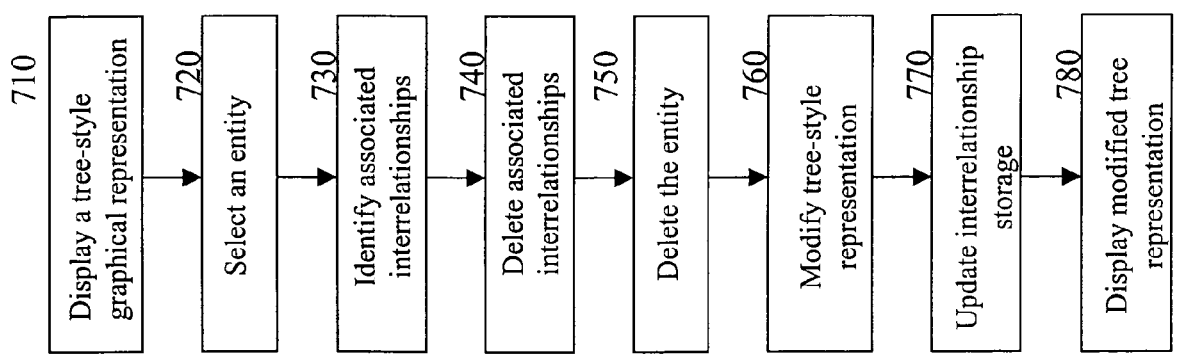
FIG. 9 is an exemplary flowchart of a process to delete an entity from an existing tree-style graphical representation.

FIG. 9 shows a flowchart of a process that deletes an existing entity from a tree-style graphical representation. The tree to be modified is displayed first in a graphical user interface at act 710. From the displayed tree, a user may graphically select, at act 720, the entity to be deleted. The selection performed at act 720 may be accomplished by simply clicking on the entity in the graphical user interface using a device such as a mouse.

When an entity is to be deleted from a tree, all the interrelationships, both hierarchical and non-hierarchical, associated with the entity may have to be deleted accordingly. The interrelationships associated with the entity, selected to be deleted, are identified at act 730. Such associated interrelationships may be identified automatically based on, for example, the interrelationship specifications of the existing tree representation. Once identified, the associated interrelationships may be removed at act 740. The removal may include removing both corresponding specifications of the associated interrelationships from storage mechanism 160, as well as corresponding interrelationships from the tree representation.

The entity to be deleted is removed from the existing tree at act 750. A modified tree representation is then generated at act 760, which includes the modification to both the abstract representation, such as a data structure, and the graphical representation of the existing tree. The modified tree representation is stored in part 270 of storage mechanism 160, either to replace the original tree representation or to be saved as a different version. Finally, the modified graphical representation of the tree is rendered at act 780 in the graphical user interface where the previous tree is displayed.

Figure 10:
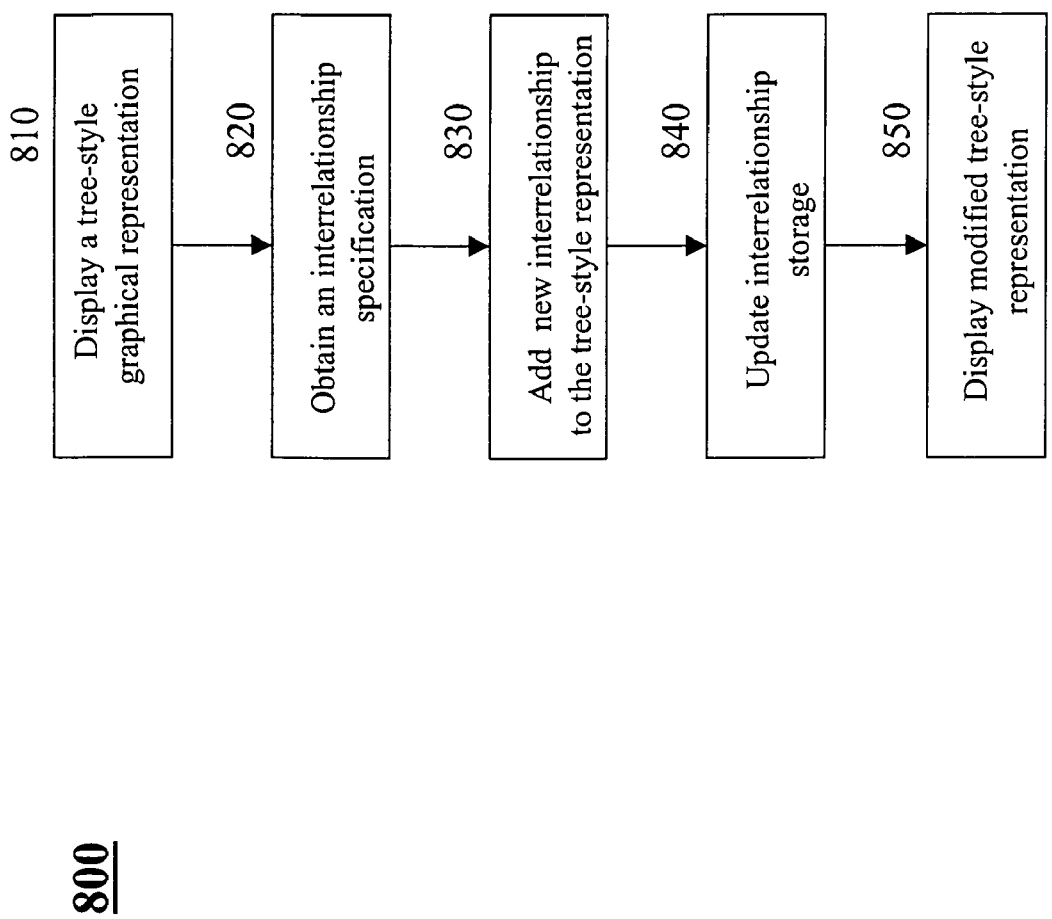
FIG. 10 is an exemplary flowchart of a process to add an interrelationship to an existing tree-style graphical representation.

Interrelationships in a tree can also be modified interactively. FIG. 10 is an exemplary flowchart of a process that allows a user to interactively add an interrelationship to an existing tree. An existing tree is displayed first at act 810 in a graphical user interface. The interrelationship to be added is specified at act 820. The specification may include the information that define the entities that form the relationship, and the information that describes the type of the relationship (hierarchical or non-hierarchical), the characteristic of the relationship (e.g., uni-directional data flow), the role that each entity plays in the relationship (e.g., which entity supplies the data in a data flow relationship), and other descriptive information associated with the relation (e.g., the nature of the data flown from one entity to another in a data flow relationship).

Different types of information in the specification, acquired at act 820, may be obtained through different means. For example, a user may select two entities that form a new interrelationship by simply clicking on the entities in the existing tree displayed in the graphical user interface. To specify the type of the new interrelationship, the user may simply click on one of the buttons (displayed, for example, in the user interface to represent different types of interrelationships) that corresponds to the desired interrelationship type. Similarly, a user may specify the characteristics of the new relationship by selecting corresponding options, listed in a menu (e.g., a pull-down menu) associated with the button representing the chosen type of interrelationship.

For example, each button representing a different type of interrelationship may associate with a menu in which different characteristics of the corresponding type of interrelationship may be presented. For instance, a button representing a non-hierarchical interrelationship may associate with a menu that lists possible characteristics of a non-hierarchical interrelationship. Such characteristics may include non-directional, uni-directional, or bi-directional. A combination of a button selection and a menu selection, in this example, may represent one of non-directional non-hierarchical interrelationship, uni-directional non-hierarchical interrelationship, and bi-directional non-hierarchical interrelationship, respectively.

A user may also create interrelationships by dragging and dropping nodes. Specifically, the user may select one or more nodes and drag them onto another node to create a desired relationship among the nodes. Graphical feedback may be conveyed to the user during the dragging process. For instance, when a selected node is dragged over a potential destination node, a rendering unit may draw all links that will be created if the selected node is dropped. All other links may be hidden during the dragging process. If the node is dropped, the rendering unit refreshes the display to depict the newly created relationship, as well as other relationships unaffected by the dragging and dropping process.

Other information about a new interrelationship, such as annotation of the relation, may be further acquired through the user interface. For example, a user may annotate a new bi-directional non-hierarchical interrelationship by entering the annotation, in a dialog box, that further specifies that the new interrelationship is a data-flow relationship between two entities and the data flows in both directions.

Using acquired modification specifications, the act at 830 produces a modified tree-style graphical representation in which the new interrelationship is incorporated to the existing tree. Both the specifications of the new interrelationship, acquired at act 820, and the modified tree-style graphical representation, produced at act 830, are used to update, at act 840, the corresponding content stored in storage mechanism 160. For example, the specifications may be added to certain part of storage mechanism 160, depending on the type of the new interrelationship (if hierarchical, add to part 250, if non-hierarchical, add to part 260). Finally, the modified tree-style graphical representation is displayed in the graphical user interface at act 850 to replace the tree representing the original tree.

Figure 11:
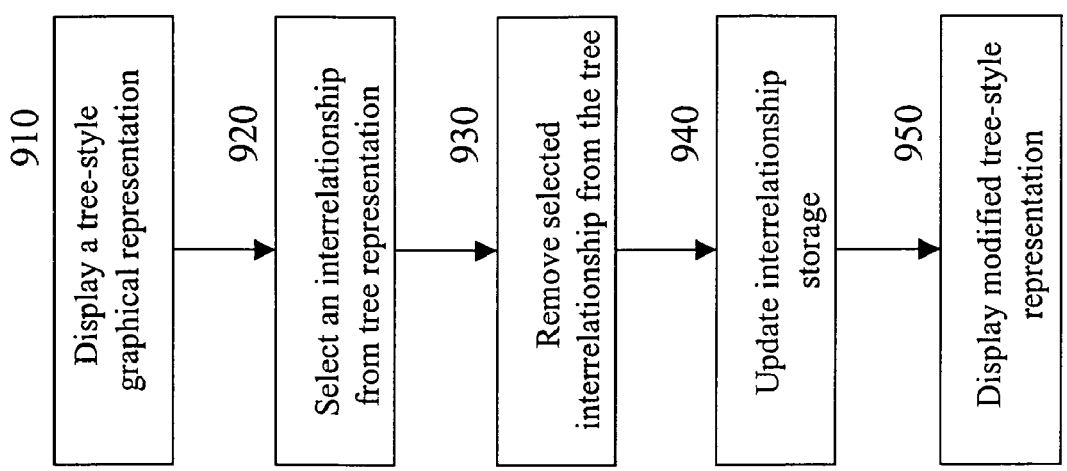
FIG. 11 is an exemplary flowchart of a process to delete an interrelationship from an existing tree-style graphical representation.

FIG. 11 shows an exemplary flowchart of a process that allows a user to interactively delete an interrelationship from an existing tree. The existing tree is first displayed at act 910 in a graphical user interface. A user may select the interrelationship to be removed at act 920 via a graphical means by, for example, clicking on the graphical rendering of the interrelationship. At act 930, the selected interrelationship is removed from the existing tree to generate a modified tree representation. The removal of the selected interrelationship, performed at act 930, may include removing both the corresponding specification for the interrelationship to be deleted from storage mechanism 160, as well as the corresponding interrelationship from the existing tree representation. The modified tree representation is stored, at act 940, in part 270 of storage mechanism 160, either to replace the original tree representation or to be saved as a different version. Finally, the modified tree is rendered at act 950 and to be displayed in the graphical user interface.

Figure 12:
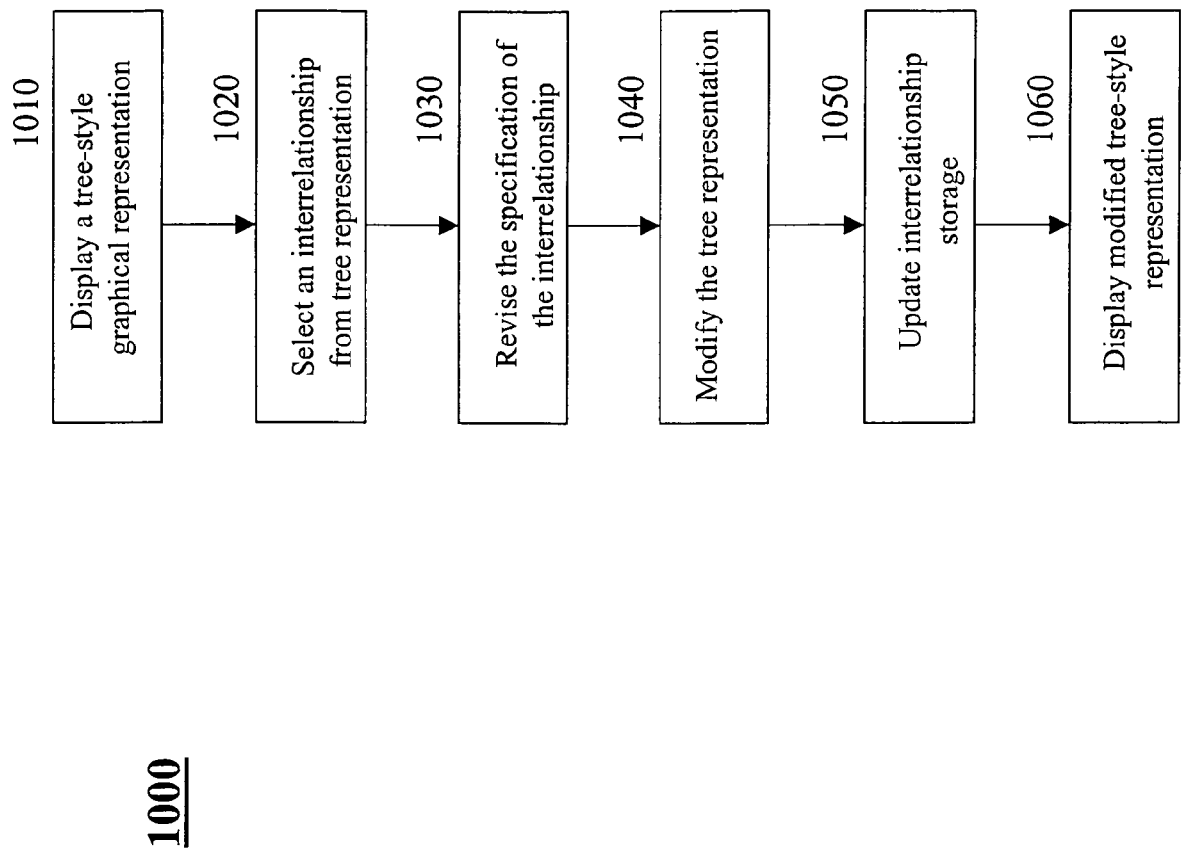
FIG. 12 is an exemplary flowchart of a process to update an interrelationship in an existing tree-style graphical representation.

FIG. 12 shows an exemplary flowchart of a process that enables a user to interactively update an existing interrelationship in a tree. Updating an interrelationship may include changing the type (hierarchical to non-hierarchical), the characteristics (uni-directional to bi-directional), and the annotation (name of the data flown from one entity to another entity) of an existing interrelationship. Some type of update, such as changing from non-hierarchical to hierarchical, may cause substantial changes in the corresponding tree representation. Other type of update, such as changing the annotation of an interrelation, may cause minimal change in the corresponding tree representation.

In FIG. 12, an existing tree is first displayed at act 1010 in a graphical user interface. Through this graphical user interface, a user may select, at act 1020, an interrelationship for updating by, for example, clicking on the graphical rendering of the interrelationship. To update an interrelationship, modification specification may need to be acquired first. The modification may then be carried out according to the modification specification.

In FIG. 12, a user may revise the existing specification of the selected interrelationship at act 1030 to produce a modification specification. This may be accomplished in a manner similar to, for example, what is described, referring to FIG. 10, for obtaining a specification of a new interrelationship. Based on the modification specification, the existing tree representation is revised at act 1040 to produce a modified tree-style representation.

The storage mechanism 160 and the tree graphical display also need to be accordingly updated. The modification specification for the modified interrelationship may replace the corresponding original specification stored in certain part of storage mechanism 160, depending on the type of interrelationship. The modified tree representation may replace the corresponding original tree representation, stored in part 270 of storage mechanism 160. The act at 1050 performs both types of update. The modified tree-style graphical representation is finally displayed at act 1060.

While the invention has been described with reference to certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A method for generating a graphical representation of interrelationships among a plurality of machine vision entities for display as a graphical user interface on a screen of a visual display unit of a machine vision system, said method comprising:

acquiring a first specification that describes a plurality of hierarchical interrelationships among said plurality of machine vision entities, the first specification being for constructing and displaying a tree-style graphical representation of the hierarchical interrelationships among said plurality of machine vision entities;

acquiring a second specification that describes a plurality of non-hierarchical data flow interrelationships among said plurality of entities, the second specification being for adding and displaying non-hierarchical data flow interrelationships among the plurality of machine vision entities;

constructing said graphical representation simultaneously representing graphically on the screen of the visual display unit of the machine vision system both said plurality of hierarchical interrelationships among said plurality of machine vision entities, and said plurality of non-hierarchical data flow interrelationships among said plurality of machine vision entities; and displaying said graphical representation to produce said graphical user interface on said screen of said visual display unit of said machine vision system.

2. The method according to claim 1, wherein said acquiring a first specification includes at least one of:
 extracting said first specification from a digital file stored on a computer-readable medium; and
 obtaining said first specification from an interactive graphical user interface.

3. The method according to claim 1, wherein said acquiring a second specification includes at least one of:
 extracting said second specification from a digital file stored on a computer-readable medium; and
 obtaining said second specification from an interactive graphical user interface.

4. The method according to claim 1, wherein said constructing said graphical representation further comprises:
 forming for display on the screen of the visual display unit of the machine vision system an initial tree-style graphical representation that depicts said set of hierarchical interrelationships among said plurality of machine vision entities; and
 incorporating said plurality of non-hierarchical data flow interrelationships into said initial tree-style graphical representation, by depicting said plurality of non-hierarchical data flow interrelationships without altering said plurality of hierarchical interrelationships depicted in said initial tree-style graphical representation, to produce said graphical representation.

5. The method according to claim 4, wherein said forming includes graphically depicting a hierarchical interrelationship between a parent entity and a child entity in such a manner that the child entity in said hierarchical interrelationship appears left-indented from where the parent entity in said hierarchical interrelationship appears.

6. The method according to claim 4, wherein said incorporating includes graphically displaying a data flow connection between any two machine vision entities involved in any one of said plurality of non-hierarchical data flow interrelationships proximate to where said two machine vision entities appear in said initial tree-style graphical representation.

7. A method for modifying a graphical representation of interrelationships among a plurality of machine vision entities, and for displaying the graphical representation as a graphical user interface on a screen of a visual display unit of a machine vision system, said method comprising at least one of:
 adding a new machine vision entity to the depiction of said graphical representation for display on the screen of the visual display unit of the machine vision system that depicts simultaneously hierarchical interrelationships among said machine vision entities, and non-hierarchical data flow interrelationships among said machine vision entities; and
 deleting a depicted machine vision entity from the depiction of said graphical representation for display on the screen of the visual display unit of the machine vision system that depicts simultaneously hierarchical interrelationships among said machine vision entities, and non-hierarchical data flow interrelationships among said machine vision entities; and further comprising:
 displaying said graphical representation to produce said graphical user interface on said screen of said visual display unit of said machine vision system.

8. The method according to claim 7, wherein said adding further comprises:

defining said new machine vision entity;
specifying a position in said graphical representation where said new machine vision entity can be inserted; and
modifying said graphical representation to incorporate said new machine vision entity at said position.

9. The method according to claim 7, wherein said deleting further comprises:
 selecting said depicted machine vision entity from said graphical representation;
 identifying any hierarchical interrelationship and any non-hierarchical interrelationship, associated with said depicted machine vision entity; and
 modifying said graphical representation to incorporate the deletion of said depicted machine vision entity and the removal of said any hierarchical interrelationship and any non-hierarchical interrelationship, identified by said identifying.

10. A method for modifying a graphical representation of interrelationships among a plurality of machine vision entities, and for displaying the graphical representation as a graphical user interface on a screen of a visual display unit of a machine vision system, said method comprising at least one of:
 adding a new hierarchical interrelationship to the depiction of said graphical representation for display on the screen of the visual display unit of the machine vision system that depicts simultaneously hierarchical interrelationships, and non-hierarchical data flow interrelationships among a plurality of machine vision entities;
 deleting a depicted hierarchical interrelationship from the depiction of said graphical representation for display on the screen of the visual display unit of the machine vision system that depicts simultaneously hierarchical interrelationships, and non-hierarchical data flow interrelationships among a plurality of machine vision entities; and
 updating a depicted hierarchical interrelationship in the depiction of said graphical representation for display on the screen of the visual display unit of the machine vision system that depicts simultaneously hierarchical interrelationships and non-hierarchical data flow interrelationships among a plurality of machine vision entities; and further comprising:
 displaying said graphical representation to produce said graphical user interface on said screen of said visual display unit of said machine vision system.

11. The method according to claim 10, wherein said adding further comprises:
 obtaining a specification that describes said new hierarchical interrelationship; and
 modifying said graphical representation for display on the screen of the visual display unit of the machine vision system according to said specification.

12. The method of any one of claim 2 and claim 11, wherein said obtaining further comprises:
 displaying various machine vision entities from said plurality of machine vision entities in said graphical user interface;
 selecting a parent entity from said various machine vision entities within said interactive graphical interface;
 selecting a child entity from said various machine vision entities within said interactive graphical interface; and
 defining a hierarchical interrelationship between said parent entity and said child entity.

13. The method according to claim 10, wherein said deleting further comprises:

selecting said depicted hierarchical interrelationship from said graphical representation; and modifying said graphical representation so that said depicted hierarchical interrelationship is removed.

14. The method according to claim 10, wherein said updating further comprises:

selecting said depicted hierarchical interrelationship from said graphical representation;

revising the specification associated with said depicted hierarchical interrelationship to produce a modified hierarchical interrelationship; and modifying said graphical representation to replace said depicted hierarchical interrelationship by said modified hierarchical interrelationship.

15. A method for modifying a graphical representation of interrelationships among a plurality of machine vision entities, and for displaying the graphical representation as a graphical user interface on a screen of a visual display unit of a machine vision system, said method comprising at least one of:

adding a new non-hierarchical data flow interrelationship for display on the screen of the visual display unit of the machine vision system to the depiction of said graphical representation;

deleting a depicted non-hierarchical data flow interrelationship for display on the screen of the visual display unit of the machine vision system from the depiction of said graphical representation; and updating a depicted non-hierarchical data flow interrelationship for display on the screen of the visual display unit of the machine vision system in the depiction of said graphical representation; and further comprising:

displaying said graphical representation to produce said graphical user interface on said screen of said visual display unit of said machine vision system.

16. The method according to claim 15, wherein said adding further comprises:

obtaining a specification that describes said new non-hierarchical data flow interrelationship; and modifying said graphical representation according to said specification.

17. The method of any one of claim 3 and claim 16, wherein said obtaining further comprises:

displaying various machine vision entities from said plurality of machine vision entities in said graphical user interface;

selecting a first machine vision entity from said various machine vision entities;

selecting a second machine vision entity from said various machine vision entities; and defining a non-hierarchical data flow interrelationship between said first machine vision entity and said second machine vision entity.

18. The method according to claim 15, wherein said deleting further comprises:

selecting said depicted non-hierarchical data flow interrelationship from said graphical representation; and modifying said graphical representation so that said depicted nonhierarchical data flow interrelationship is removed.

19. The method according to claim 15, wherein said updating further comprises:

selecting said depicted non-hierarchical data flow interrelationship from said graphical representation;

revising the specification associated with said depicted non-hierarchical data flow interrelationship to produce a modified non-hierarchical data flow interrelationship; and modifying said graphical representation to replace said depicted non-hierarchical data flow interrelationship by said modified non-hierarchical data flow interrelationship.

20. A computer-readable storage medium encoded with a program for generating a graphical representation of interrelationships among a plurality of machine vision entities for display as a graphical user interface on a screen of a visual display unit of a machine vision system, said program comprising:

acquiring a first specification that describes a plurality of hierarchical interrelationships among said plurality of machine vision entities, the first specification being for constructing a tree-style graphical representation for display on the screen of the visual display unit of the machine vision system;

acquiring a second specification that describes a plurality of non-hierarchical data flow interrelationships among said-plurality of machine vision entities, the second specification being for adding to the tree-style graphical representation;

constructing said graphical representation so as to simultaneously represent on the screen of the visual display unit of the machine vision system both said set of hierarchical interrelationships and said plurality of non-hierarchical data flow interrelationships among said plurality of machine vision entities; and displaying said graphical representation to produce said graphical user interface on said screen of said visual display unit of said machine vision system.

21. A computer-readable storage medium encoded with a program for modifying a graphical representation of interrelationships among a plurality of machine vision entities, and for displaying the graphical representation as a graphical user interface on a screen of a visual display unit of a machine vision system, said program comprising at least one of:

adding another machine vision entity to the depiction of said graphical representation that depicts simultaneously hierarchical interrelationships for display on the screen of the visual display unit of the machine vision system, and non-hierarchical data flow interrelationships for display on the screen of the visual display unit of the machine vision system among a plurality of machine vision entities; and deleting a depicted machine vision entity from the depiction of said graphical representation that depicts simultaneously hierarchical interrelationships for display on the screen of the visual display unit of the machine vision system, and non-hierarchical data flow interrelationships for display on the screen of the visual display unit of the machine vision system among a plurality of machine vision entities; and further comprising:

displaying said graphical representation to produce said graphical user interface on said screen of said visual display unit of said machine vision system.

22. A computer-readable storage medium encoded with a program for modifying a graphical representation of interrelationships among a plurality of machine vision entities, and for displaying the graphical representation as a graphical user interface on a screen of a visual display unit of a machine vision system, said program comprising at least one of:
- adding another hierarchical interrelationship to the depiction of said graphical representation for display on the screen of the visual display unit of the machine vision system that depicts simultaneously hierarchical interrelationships, and non-hierarchical data flow interrelationships among a plurality of machine vision entities;
- deleting a depicted hierarchical interrelationship from the depiction of said graphical representation for display on the screen of the visual display unit of the machine vision system that depicts simultaneously hierarchical interrelationships, and non-hierarchical data flow interrelationships among a plurality of machine vision entities; and
- updating a depicted hierarchical interrelationship in the depiction of said graphical representation for display on the screen of the visual display unit of the machine vision system that depicts simultaneously hierarchical interrelationships, and non-hierarchical data flow interrelationships among a plurality of machine vision entities; and further comprising:
- displaying said graphical representation to produce said graphical user interface on said screen of said visual display unit of said machine vision system.

23. A computer-readable storage medium encoded with a program for modifying a graphical representation of interrelationships among a plurality of machine vision entities, and for displaying the graphical representation as a graphical user interface on a screen of a visual display unit of a machine vision system, said program comprising at least one of:
- adding another non-hierarchical data flow interrelationship to the depiction of said graphical representation for display on the screen of the visual display unit of the machine vision system;
- deleting a depicted non-hierarchical data flow interrelationship from the depiction of said graphical representation for display on the screen of the visual display unit of the machine vision system;
- updating a depicted non-hierarchical data flow interrelationship in the depiction of said graphical representation for display on the screen of the visual display unit of the machine vision system; and further comprising:
- displaying said graphical representation to produce said graphical user interface on said screen of said visual display unit of said machine vision system.

24. A system for generating a graphical representation of interrelationships among a plurality of machine vision entities for display as a graphical user interface of a machine vision system, said system for generating a graphical representation comprising:
- an acquisition mechanism to acquire specifications for hierarchical interrelationships and non-hierarchical data flow interrelationships for display on a screen of a visual display unit of the machine vision system among a plurality of machine vision entities;
- a storage mechanism to store said specifications for said hierarchical interrelationships and nonhierarchical data flow interrelationships for display on the screen of the visual display unit of the machine vision system, acquired by said acquisition mechanism;
- a graphical representation generation unit to generate said graphical representation for display on the screen of the visual display unit of the machine vision system based on said hierarchical interrelationships, and non-hierarchical data flow interrelationships; and
- a display unit on which said graphical representation is displayed to produce said graphical user interface of said machine vision system.

25. A system for acquiring the information about a plurality of machine vision entities and at least one specification describing the interrelationships for display on a screen of a visual display unit of a machine vision system among said plurality of machine vision entities, said system comprising:
- a computer-readable medium on which at least one digital file is stored;
- an extractor to extract, from said at least one digital file, said information about said plurality of machine vision entities and said at least one specification about said interrelationships for display on the screen of the visual display unit of the machine vision system among said plurality of machine vision entities;
- an interactive graphical user interface for display on the screen of the visual display unit of the machine vision system;
- an interactive acquisition unit to interactively acquire, via said interactive graphical user interface, said information about said plurality of machine vision entities and said at least one specification about said interrelationships among said plurality of machine vision entities; and
- a storage mechanism to store the information about said plurality of machine vision entities and said at least one specification for display on the screen of the visual display unit of the machine vision system, acquired by at least one of any said extractor and said interactive acquisition unit.

26. A system for constructing a graphical representation of interrelationships among a plurality of machine vision entities for display as a graphical user interface on a screen of a display unit of a machine vision system, said system for constructing comprising:
- a storage mechanism to store a first specification describing a plurality of hierarchical interrelationships for display on the screen of the display unit of the machine vision system and a second specification describing a plurality of non-hierarchical data flow interrelationships for display on the screen of the display unit of the machine vision system among a plurality of machine vision entities;
- an initial tree-style graphical representation generator to generate an initial tree-style graphical representation for display on the screen of the display unit of the machine vision system based on said first specification retrieved from said storage mechanism;
- a graphical representation generator to generate said graphical representation for display on the screen of the display unit of the machine vision system based on said initial tree-style graphical representation by depicting non-hierarchical data flow interrelationships among said plurality of machine vision entities in said initial tree-style graphical representation according to said second specification retrieved from said storage mechanism; and
- a display unit to display said graphical representation generated by said graphical representation generator.

* * * * *